United States Patent
Hamza et al.

(10) Patent No.: US 8,967,495 B2
(45) Date of Patent: Mar. 3, 2015

(54) DEVICE COMPRISING A NON-RETURN VALVE

(75) Inventors: Brahim Hamza, Guilherand-granges (FR); Jean-Michel Issartel, Romans sur Isere (FR); Akim Driss Bouguerra, Villeurbanne (FR); Rodolphe Emaille, La Cote St André (FR); Christophe Broquet, Bonneval (FR); Gérard Jeuffe, Bazemont (FR)

(73) Assignee: Peugeot Citroen Automobiles SA (FR)

(*) Notice: Subject to any disclaimer, the term of this patent is extended or adjusted under 35 U.S.C. 154(b) by 0 days.

(21) Appl. No.: 13/824,590

(22) PCT Filed: Sep. 15, 2011

(86) PCT No.: PCT/FR2011/052130
§ 371 (c)(1),
(2), (4) Date: May 29, 2013

(87) PCT Pub. No.: WO2012/038646
PCT Pub. Date: Mar. 29, 2012

(65) Prior Publication Data
US 2013/0240569 A1    Sep. 19, 2013

(30) Foreign Application Priority Data
Sep. 20, 2010 (FR) ..................... 10 57506

(51) Int. Cl.
*B05B 1/10* (2006.01)
*B05B 11/00* (2006.01)
*B60S 1/52* (2006.01)

(52) U.S. Cl.
CPC ............ *B05B 11/3001* (2013.01); *B60S 1/528* (2013.01)
USPC ....................................... 239/284.2; 239/570

(58) Field of Classification Search
CPC ................................. B60S 1/528; B05B 15/10
USPC ............ 222/496; 239/205, 284.2, 284.1, 570
See application file for complete search history.

(56) References Cited

U.S. PATENT DOCUMENTS

| | | | | | |
|---|---|---|---|---|---|
| 2,745,153 | A | * | 5/1956 | Burkett | 222/593 |
| 4,930,669 | A | * | 6/1990 | Dickau et al. | 222/309 |
| 5,145,083 | A | * | 9/1992 | Takahashi | 220/203.24 |
| 5,242,114 | A | * | 9/1993 | Camier et al. | 239/284.2 |
| 6,752,329 | B1 | * | 6/2004 | Price | 239/284.2 |
| 2011/0277263 | A1 | * | 11/2011 | Guo et al. | 15/250.002 |

FOREIGN PATENT DOCUMENTS

DE    102005002259 A1    7/2006
EP    0262402 A2 *    4/1988
(Continued)

OTHER PUBLICATIONS

Machine Translation of EP 0262402, 5 pgs.*
(Continued)

*Primary Examiner* — Daniel R Shearer
(74) *Attorney, Agent, or Firm* — Polster Lieder

(57) ABSTRACT

The invention relates to a device for dispensing a liquid, including a piston that is movable within a chamber and a nozzle connected to the piston such that the movement of the piston causes the movement of the nozzle, wherein one end of the piston engages the chamber so as to form a non-return valve.

5 Claims, 1 Drawing Sheet

(56) References Cited

FOREIGN PATENT DOCUMENTS

| FR | 2666777 | A1 | 3/1992 |
| FR | 2836842 | A1 | 9/2003 |
| WO | 03095277 | A1 | 11/2003 |

OTHER PUBLICATIONS

Machine Translation of EP 0262402, Mar. 2014, 5 pgs.*
International Search Report from corresponding International Patent Application No. PCT/FR2011/052130, mailed Nov. 10, 2011.

* cited by examiner

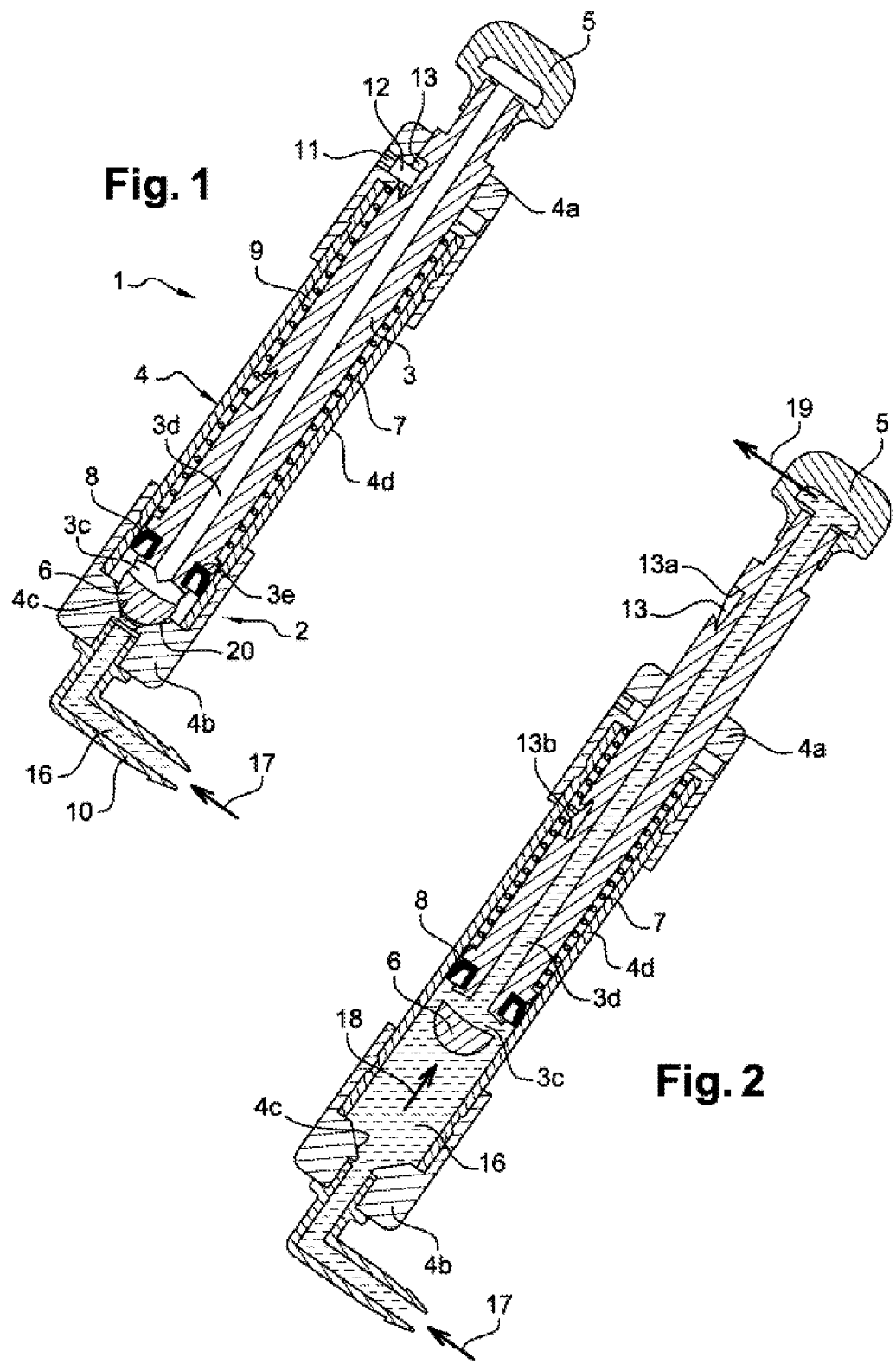

DEVICE COMPRISING A NON-RETURN VALVE

CROSS-REFERENCE TO RELATED APPLICATIONS

The present invention is the US national stage under 35 U.S.C. §371 of International Application No. PCT/FR2011/052130, which was filed on Sep. 15, 2011 and which claims the priority of application FR 1057506 filed on Sep. 20, 2010 the content of which (text, drawings and claims) is incorporated here by reference in its entirety.

TECHNICAL FIELD

The present invention relates to a device for dispensing a liquid, including a nozzle whose movement is caused by a piston, and integrating a non-return valve function.

BACKGROUND

In the prior art, we know the document FR2666777 which describes a telescopic nozzle system for a motor vehicle. This nozzle consists of an actuator containing a window washing liquid under pressure which exerts a thrust on a piston that is connected to the tip of the nozzle and rises so as to position it opposite the windshield. The window washing liquid circulates in a passage that goes through the piston and pushes a ball which closes an opening, and then penetrates into the head of the nozzle so as to be projected against the windshield. In this device, a conventional non-return valve is placed in the conduit of the rod of the piston in order to ensure the lifting of the tip of the nozzle and to establish a connection between the washing liquid supply pipes, in order to ensure the spraying of the washing liquid against the surface to be cleaned.

SUMMARY

In the supply pipes of the prior art, a conventional non-return valve is simply placed between two pipe sections, in such a manner as to avoid the return of the fluid to the washing reservoir and avoid an excessively long pulse for a subsequent washing cycle.

With a view to decreasing the number of parts and simplifying the installation of the supply pipes, the invention proposes not simply to eliminate the non-return valve, but to have this non-return function be carried out by an already existing part, namely in this instance the piston itself, by way of its cooperation with the chamber in which it slides.

In order to preserve the non-return valve function and overcome the drawbacks of draining the supply circuit, the invention has developed a device for dispensing a liquid, advantageously a washing liquid, the piston playing the role of a non-return valve in such a manner as to make it possible to maintain the liquid level as close as possible to the nozzle, and thus, as soon as the wash command pulse has occurred, the washing liquid gushes out of the nozzle.

For this purpose, the present invention relates to a device for dispensing a liquid, including a piston that is movable in a chamber and a nozzle connected to the piston such that the movement of the piston causes the movement of the nozzle, one end of the piston engaging with the chamber so as to form a non-return valve.

According to another feature, the lower end of the piston has a convex, advantageously spherical shape.

According to another advantageous feature, the nozzle is stationary relative to the piston.

Advantageously, the piston is a single piece.

According to a variant, the body of the piston through which the washing liquid penetrates has a truncated shape and the seal of the spherical portion of the piston on the truncated portion of the body is produced on a circular line.

According to another variant, the chamber consists of a tubular part closed by two stoppers.

Advantageously, the piston is provided with a sealing washer, above the portion in the form of a spherical cap.

Advantageously, the piston does not have a sealing washer at the end of the piston.

According to a feature, the supply pipe secured to the lower end of the body is bent, and the piston does not descend to the bend.

DRAWINGS

Other features and advantages of the invention will become clear following a reading of the description given below for information, in reference to the appended drawings.

FIG. 1 is a plan view diagrammatically showing a device comprising a non-return valve in the closed position according to the invention.

FIG. 2 is a plan view diagrammatically showing a device comprising a non-return valve in the open position according to the invention.

DETAILED DESCRIPTION

FIG. 1 is a plan view diagrammatically showing a device 1 comprising a non-return valve 2 in the closed position according to the invention. The device 1 is a telescope including a piston 3 and a body 4. The body 4 is a tubular part 4d closed by two stoppers 4a, 4b at each one of its ends. The piston 3 comprises at its upper end a nozzle 5 and at its lower a convex, preferably spherical, cap 6. The piston 3 is directed downward under the action of a compression spring 7 bearing against the bottom of the upper closing stopper 4a of the body 4 and against a shoulder 3a of the rod 3b of the piston 3. The lower end of the piston 3 comprises, above the spherical cap 6, two transverse openings 3c opening into an axial pipe 3d of the piston 3, making it possible to supply a washing liquid to the nozzle 5 placed at the upper end of the piston 3. Above the openings 3c, the piston 3 is provided with a washer 8 placed in a circular groove 3e. This washer 3e prevents the washing liquid from being introduced into the circular space 9 where the compression spring 7 is located. The lower closing stopper 4b of the body 4 includes axially a through opening 4c to which a pipe 10 is screwed, which is provided with a shoulder bearing against the stopper 4b. The pipe 10 is bent at a right angle. The washing liquid 16 penetrates into the pipe 10 along the arrow 17. The circular opening of the body 4 opens into the interior of the body 4 with a flared portion 4c having a substantially truncated shape forming a container of the end of the spherical cap 6 of the piston 3. The seal is achieved in this case on a circular line 20.

When the end of the piston 3 bears against the flared portion 4c, the seal is achieved and it forms the non-return valve 2. The flared portion 4c can be of cylindro-spherical shape. In this manner, the seal is achieved over a surface. During operation, the piston 3 can move only along its axis. In this case, a dog point screw 11 is screwed in the upper stopper 4a, the dog point 12 running into a groove 13 produced on the periphery of the piston 3 along its longitudinal axis. In reference to the figure, the groove 13 is helical, consequently, during operation, the nozzle 5 moves along a helical trajectory during the projection of the liquid.

FIG. 2 is a plan view diagrammatically showing a device 1 comprising the non-return valve 2 in the open position according to the invention, that is in an operating position that is substantially halfway in the helical groove 13, taking into consideration the position of the teat 12 of the screw 11, which is located between the beginning 13a of the groove 13, visible on the rod extracted from the piston 3, and the end 13b of the groove 13 visible on the internal rod of the piston 3.

In the figure, the liquid penetrates into the body 4 through the flared opening 4c which, under the pressure of the liquid 16 in the direction of the arrow 18, pushes the piston 3 upward against the force exerted by the compression spring 7. Simultaneously, the liquid penetrates through the two openings 3c into the axial conduit 3d of the piston 3 to the nozzle 5, where it is projected along the arrow 19 against the surface to be cleaned. Preferably, the movement of the piston causes the movement of the nozzle 5 mechanically, and thus directly.

After the end of the cycle, the pressure of the liquid decreases and the spring 7 pushes back the piston 3 until it closes the flared opening 4c and implements the non-return valve function.

Naturally, the invention is obviously not limited to the embodiment example described more specifically and represented in reference to the appended drawings; on the contrary, it encompasses all the variants.

The invention claimed is:

1. A device for dispensing a liquid, said device comprising:
   a tubular body closed at an upper end by an upper stopper and closed at a lower end by a lower stopper, the lower stopper including an opening through which washing fluid can penetrate into a chamber of the body, an end of the opening comprising a truncated conical shaped portion;
   a piston movably disposed within the chamber, a lower end of the piston comprising:
      a spherically shaped cap, the spherically shaped cap disposable within the truncated conical shaped portion of the body lower stopper to provide a circular line seal;
      a shoulder defining a circular space between the piston and the tubular body; and
      an annual groove formed between the shoulder and the spherically shaped cap;
   a compression spring disposed between the piston and the tubular body, the spring structured and operable to apply a force to the shoulder for disposing the spherically shaped cap within the truncated conical shaped portion of the lower stopper;
   a washer disposed within the annular groove, the washer structured and operable to prevent the washing fluid from being introduced into the circular space between the piston and the tubular body; and
   a nozzle connected to the piston such that movement of the piston causes movement of the nozzle.

2. The device according to claim 1, wherein the nozzle is stationary relative to the piston.

3. The device according to claim 2, wherein the piston is a single piece.

4. The device according to claim 1, wherein the piston does not have a sealing washer disposed at the end of the piston.

5. The device according to claim 1, further comprising:
   a body that defines the chamber; and
   a supply pipe secured to a lower end of the body, wherein the supply pipe is bent, and wherein the piston cannot descend to the bend.

\* \* \* \* \*